US012354813B2

(12) United States Patent
Buschmann et al.

(10) Patent No.: US 12,354,813 B2
(45) Date of Patent: *Jul. 8, 2025

(54) ACTUATION DEVICE FOR MOUNTING ON A VEHICLE PART, VEHICLE AND METHOD FOR ACTUATION FOR TRIGGERING A VEHICLE FUNCTION

(71) Applicant: Huf Hülsbeck & Fürst GmbH & Co. KG, Velbert (DE)

(72) Inventors: Gerd Buschmann, Velbert (DE); Michael Theidel, Mülheim (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/640,675

(22) PCT Filed: Aug. 27, 2020

(86) PCT No.: PCT/EP2020/073966
§ 371 (c)(1),
(2) Date: Mar. 4, 2022

(87) PCT Pub. No.: WO2021/043663
PCT Pub. Date: Mar. 11, 2021

(65) Prior Publication Data

US 2022/0328263 A1 Oct. 13, 2022

(30) Foreign Application Priority Data

Sep. 5, 2019 (DE) ..................... 10 2019 123 841.2

(51) Int. Cl.
*H01H 13/06* (2006.01)
*G05G 1/02* (2006.01)
(Continued)

(52) U.S. Cl.
CPC ............... *H01H 13/06* (2013.01); *G05G 1/02* (2013.01); *G05G 5/05* (2013.01); *H01H 13/14* (2013.01);
(Continued)

(58) Field of Classification Search
CPC ........ H01H 13/06; H01H 13/14; H01H 13/20; H01H 2215/004; H01H 13/26; H01H 9/04;
(Continued)

(56) References Cited

U.S. PATENT DOCUMENTS 6,091,066 A 7/2000 Sugihara
6,626,473 B1 * 9/2003 Klein ................. B29C 45/1676 292/347
(Continued)

FOREIGN PATENT DOCUMENTS

DE 102011008989 A1 7/2012
DE 102014107407 A1 11/2015
(Continued)

OTHER PUBLICATIONS

Office Action for European Application No. 20765231.4 mailed on Oct. 2, 2023, with its English translation, 8 pages.
(Continued)

*Primary Examiner* — Lheiren Mae A Caroc
(74) *Attorney, Agent, or Firm* — Christian S. Hans; Peter W. Schroen; Bret E. Field

(57) ABSTRACT

The invention relates to an actuation device for installing on a movable vehicle part, in particular in the form of a door or a hatch, having an electric switch means with a switch element for initiating a vehicle function and having a housing unit with at least one first and second housing element that at least partly form a housing interior, in which
(Continued)

the switch element is arranged. The invention additionally relates to a vehicle and to an actuation method.

17 Claims, 5 Drawing Sheets

(51) Int. Cl.
*G05G 5/05* (2006.01)
*H01H 13/14* (2006.01)
*H01H 13/20* (2006.01)

(52) U.S. Cl.
CPC ......... *H01H 13/20* (2013.01); *G05G 2505/00* (2013.01)

(58) Field of Classification Search
CPC .......... H01H 13/183; G05G 1/02; G05G 5/05; G05G 2505/00; E05B 83/18; E05B 81/76; E05B 77/34
See application file for complete search history.

(56) References Cited

U.S. PATENT DOCUMENTS

| | | | | |
|---|---|---|---|---|
| 7,777,141 | B2 | 8/2010 | Ishiguro | |
| 9,487,974 | B2 * | 11/2016 | Saitou | E05B 81/76 |
| 11,390,246 | B2 | 7/2022 | Spick et al. | |
| 12,142,449 | B2 * | 11/2024 | Buschmann | G05G 5/05 |
| 2004/0256210 | A1 | 12/2004 | Morita et al. | |
| 2008/0034821 | A1 | 2/2008 | Ishiguro | |
| 2008/0034921 | A1 | 2/2008 | Vanheusden et al. | |
| 2010/0072050 | A1 | 3/2010 | Kubota | |
| 2012/0039052 | A1 | 2/2012 | Valles Rangel et al. | |
| 2015/0368935 | A1 | 12/2015 | Sugita et al. | |
| 2016/0211094 | A1 * | 7/2016 | Fuchs | E05B 81/76 |
| 2016/0217953 | A1 | 7/2016 | Ely et al. | |
| 2018/0209182 | A1 | 7/2018 | Beck et al. | |
| 2022/0336162 | A1 | 10/2022 | Boczek et al. | |

FOREIGN PATENT DOCUMENTS

| | | | |
|---|---|---|---|
| DE | 102015000465 | A1 | 7/2016 |
| DE | 202016001147 | U1 | 5/2017 |
| EP | 1108834 | A2 | 6/2001 |
| WO | WO0140607 | A1 | 6/2001 |
| WO | WO2006106033 | A1 | 10/2006 |
| WO | WO2018197771 | A1 | 11/2018 |

OTHER PUBLICATIONS

Office Action for European Application No. 20767485.4 mailed on Oct. 4, 2023, with its English Translation, 8 pages.
Office Action for European Application No. 20765233.0 mailed on Oct. 4, 2023, with its English Translation, 8 pages.
Office Action for European Patent Application No. 20 765 231.4, mailed Mar. 11, 2024, and its English translation, 22 pages.

* cited by examiner

ACTUATION DEVICE FOR MOUNTING ON A VEHICLE PART, VEHICLE AND METHOD FOR ACTUATION FOR TRIGGERING A VEHICLE FUNCTION

INTRODUCTION

The invention relates to an actuation device for mounting on a vehicle part, in particular in the form of a door or a flap in accordance with the generic term of the independent device claim, to a vehicle in accordance with the generic term of the subsidiary device claim, and to a method for actuation for triggering a vehicle function of a vehicle by means of an actuation device.

Actuation devices for vehicles which can be mounted on a movable vehicle part are known from the prior art. Such actuation devices serve, for example, to open the movable part or to trigger another vehicle function. In order not to impair the appearance of the vehicle or to impair it only slightly, such actuation devices are frequently combined with other functional components or design elements and are arranged in door handles or the like. Furthermore, it is known to place such devices below a vehicle emblem so that the user can use the emblem as an actuation surface. In particular, due to the increasing complexity and the increasing number of parts, it is desirable to make such devices compact while keeping the number of parts and/or the costs low.

From DE 10 2011 008 989 A1, for example, a switch device is known which is mounted on a wall element of a vehicle. A sealing is provided to seal the housing of the switch device. Further, a leaf spring is provided to return the switch device to an initial state after actuation by a user. It has been found to be a disadvantage that the sealing is costly to assemble, since the sealing simultaneously secures the housing parts to each other. Furthermore, the leaf spring requires additional installation space within the device. Furthermore, a travel distance for actuating the microswitch used can be optimized.

SUMMARY

It is an object of the present invention to at least partially eliminate the aforementioned disadvantages known from the prior art. In particular, it is an object of the present invention to create and/or enable a cost-effective and compact design of an actuation device for actuating a vehicle function of a vehicle. Preferably, the actuation should be simplified for a user and, ideally, the wear during the actuation should be minimized.

The foregoing problem is solved by an actuation device having the features of the independent device claim, a vehicle having the features of the subsiding device claim, and a method for actuation having the features of the independent method claim. Further features and details of the invention will be apparent from the respective dependent claims, the description and the drawings. In this context, features and details described in connection with the actuation device according to the invention also apply, of course, in connection with the vehicle according to the invention and/or the method for actuation according to the invention, and vice versa in each case, so that reference is or can always be made mutually with regard to the disclosure concerning the individual aspects of the invention.

According to a first aspect of the invention, an actuation device is provided for mounting on a, preferably movable, vehicle part, in particular in the form of a door or a flap. The actuation device comprises an electrical switching means/device with a switching element for triggering a vehicle function. Further, the actuation device comprises a housing unit with at least a first and a second housing element, wherein the first and second housing elements at least partially or completely form a housing interior. The switching element is arranged in the housing interior. A movement free space is formed between the first and second housing elements, whereby the second housing element is at least regionally movable between a rest position and an actuation position for actuating the switching element relative to the first housing element. It is further provided that the movement free space is at least regionally closed by a restoring means/device for moving the second housing element from the actuation position to the rest position, in particular to prevent liquid from entering the housing interior via the movement free space at least regionally. This actuation device is of particularly compact and simple construction.

In particular, the actuation device may be configured for attachment to a vehicle panel of the vehicle part. In this case, the actuation device can be mountable on an outer side of the vehicle part, which faces the user when the actuation device is actuated, or on an inner side of the vehicle part, which faces away from the user when the actuation device is actuated. Thus, it is conceivable that the user actuates the actuation device directly to trigger the vehicle function, for example by pushing the actuation device or a part of the actuation device with the hand. In particular, the actuation device may be designed in the form of a door handle or as a door handle or as an actuation plate or pressure plate with a corresponding housing unit. It is also conceivable that the user can actuate the actuation device indirectly, for example by pressing on the vehicle part so that the vehicle part is deformed, in particular elastically, and the switching device for triggering the vehicle function is thereby actuated.

In particular, the switching element comprises an electrical switch, for example in the form of a microswitch, by means of which the vehicle function can be triggered. In particular, it is also conceivable that the electrical switching device comprises electronics in order to be able to send an actuation signal to a vehicle electronic system as a function of an actuation by the user. Preferably, the switching element is arranged on the first housing element. In particular, the first housing element may thus also be referred to as a support element for the switching element.

The first and/or second housing element of the housing unit preferably comprises of a plastic. As a result, the housing unit may be reduced in weight. The housing interior can in particular be understood as a hollow space. In particular, the housing interior space is formed at least partially or completely between the first and second housing elements. Thus, a volume of the housing interior can in particular be reduced during movement of the second housing element. By the at least area-wise movement of the second housing element relative to the first housing element, it may be understood that at least a portion of the second housing element is movable relative to the first housing element. In particular, for example, a deformation of the first and/or second housing element may cause the second housing element to at least regionally approach the first housing element when moved from the rest position to the actuation position. The movement from the rest position to the actuation position can in particular activate the switching device. Thereby, the switching device is preferably unactuated in the rest position and actuated in the actuation position.

For moving the second housing element from the actuation position to the rest position, the restoring device may in particular be of spring-like design. Preferably, the movement of the second housing element from the actuation position into the rest position is performed automatically by the restoring device, in particular when a user has terminated an actuation action of the actuation device and/or no longer exerts a force on the actuation device. Furthermore, it is also conceivable that the movement of the second housing element from the actuation position to the rest position is initiated by an electrical signal to the restoring device.

The free space for movement can in particular be understood as an area of the actuation device separate from the housing interior, preferably in which the relative movement of the second housing element to the first housing element is enabled and/or guided. For example, the movement free space and the housing inner space can be separated at least in some areas by a projection of the first housing element. In particular, the movement area may also be referred to as an intermediate area. In particular, the movement free space may form a fluid path from an outer region into the housing inner space, in which the restoring device is arranged to interrupt the fluid path. Due to the sealing effect of the restoring device, the electrical switching device and/or further components in the housing interior may be protected from possibly harmful environmental influences. The movement clearance may comprise a mechanical clearance, in particular in the form of a gap, between the housing elements. In this regard, the housing elements in the movement free space may also loosely abut and/or rub against each other. In particular, the movement free space may be formed adjacent to the housing interior, preferably at least partially circumferentially around the housing interior, and/or at least partially connected to the housing interior. Through the movement free space, the second housing element may be movable between the rest position and the actuation position in a translatory and/or rotatory movement. In particular, the movement free space may be formed completely circumferentially around the housing interior, in particular whereby the second housing element is movable with a stroke movement relative to the first housing element at least in regions between a rest position and an actuation position. Thereby, the movement free space can extend at least partially in a direction of movement of the second housing element.

By the fact that the restoring device fulfils on the one hand the restoring function and on the other hand a housing and/or sealing function, the actuation device can be compactly designed. In particular, a number of parts can be reduced at the same time if the restoring device combines several functions. As a result, for example, an additional spring in the interior of the housing can be dispensed with, so that installation space for electronic elements is gained in the interior of the housing or the device can be reduced in size overall. Preferably, the actuation device can have a smaller width in a direction perpendicular to the vehicle part than in a direction parallel to the vehicle part. In particular, a small travel distance for actuating the actuation device can thus be provided and installation space in the direction of the vehicle part can be saved. Thus, a low-cost actuation device can be created which, due to its compact design, can be advantageously integrated into an appearance of the vehicle and/or the vehicle part.

Furthermore, in an actuation device according to the invention, it may advantageously be provided that the restoring device comprises an elastic material for deforming and/or bending the restoring device during the movement of the first housing element from the actuation position to the rest position. The elastic material may for example comprise a plastic material, in particular an elastomer or the like. Furthermore, the elasticity of the elastic material may be supported by a small cross-section of the restoring device. Thus, it is conceivable that the restoring device has a smaller cross-section than adjacent components and/or adjacent component sections. When deforming the restoring device, it may be envisaged, for example, that the restoring device is compressed and/or changes shape in such a way as to allow the second housing element to move from the rest position to the actuation position. Upon movement from the actuation position to the rest position, the restoring device may deform back to exert a force on the second housing member to enable or initiate the movement. When said restoring device bends, it may be provided, for example, that an end and/or a portion of said restoring device is fixedly connected to said second housing member. In particular, the restoring device may be mechanically configured as an elastic bending bar. Thus, by means of the restoring device, an automatic restoring of the second housing element from the actuation position to the rest position can be performed in a simple manner. In particular, the elastic material may be prestressed in the rest position of the second housing element in the assembled state of the housing unit, so that a sealing effect of the restoring device may be improved.

Furthermore, in an actuation device according to the invention, it can advantageously be provided that the restoring device is designed to circulate at least in sections around the housing interior, in order to prevent liquid from penetrating into the housing interior, and preferably also into the movement free space, at least in sections, in particular wherein the restoring device extends in a ring-like manner around the housing interior. By the fact that the restoring device is formed at least in sections circumferentially around the housing interior, it can be understood that the restoring device is formed completely circumferentially or seals at least a partial section around the housing interior. In particular, the restoring device may engage a plurality of restoring elements arranged in a regular pattern and/or at regular intervals around the housing interior. This may, for example, seal certain locations that would structurally allow fluid ingress. For this purpose, the restoring device may, for example, be of O-ring-like design, which may allow easy assembly of the restoring device between the housing elements. Preferably, the restoring device extends in a circular manner around the interior of the housing.

It is further conceivable in an actuation device according to the invention that the switching element is a sensor element for inductively detecting the movement of the second housing element (also referred to as an LDC sensor for short), in particular wherein the sensor element is arranged on a printed circuit board having a plurality of electronic components for detecting the actuation position of the second housing element. Hereby, a particularly wear-free embodiment of the invention can be realized, since no electromechanical component, such as switches or pushbuttons, is required. In this context, the sensor element may comprise, for example, an oscillator in order to generate an electric field, in particular in the interior of the housing. Depending on a change in an electric field parameter of the electric field, it may thereby be determinable by the sensor element whether the second housing element has moved in the direction of the sensor element. Preferably, the switching device is fixedly connected to the first housing element in order to be able to detect the relative movement of the second housing element. In particular, the electronic components may be configured to evaluate a sensor signal from the sensor element. Thus, sensor electronics may be formed by the circuit board with the electronic components in order to be able to evaluate a sensor signal of the sensor element in the vicinity of the sensor element. As a result, losses in the transmission of the signal may be reduced. Further, a higher accuracy in detecting the movement of the second housing element may be achievable. In particular, a movement path of the second housing element from the rest position to the actuation position may be significantly reduced by the sensor element for inductive detection. Preferably, the maximum movement path may thereby be less than or equal to 1 mm, preferably less than or equal to 0.5 mm, particularly preferably about 0.1 mm. Thus, the advantage arises that a short actuation movement of the user may be sufficient to trigger the vehicle functions. In this respect, even a contact of the actuation device by the user as an actuation action may be sufficient to trigger the vehicle function. In particular, if the restoring device comprises an elastic material for a reset movement and the actuation is manual, a required force of the user increases with increasing movement distance. Therefore, if the movement path is kept short by the inductive detection of the sensor element, a particularly convenient actuation force can also be provided for the actuation device. At the same time, a short actuation path results in the advantage that hardly any air needs to be compressed in the interior of the housing if the volume of the interior of the housing is only slightly reduced. Thus, for example, it may not be necessary to provide an air outlet at the housing interior when the second housing element moves towards the first housing element at least in some regions. Additionally or alternatively, it is conceivable that the switching device comprises a sensor element for capacitively detecting the movement of the second housing element.

Preferably, in an actuation device according to the invention, it can be provided that the switching device has a counter-electrode, in particular with a planar extension, for electromagnetic interaction with the sensor element, which counter-electrode is arranged in particular on the second housing element. Suitably, the counter-electrode is arranged over a distance (or spaced apart) from the sensor element and interacts therewith in a contact-free manner. Preferably, the counter electrode may comprise a magnetizable and/or metallic material. For example, it is conceivable that the counter-electrode is attached as a foil, in particular in the housing interior, to the second housing element or is vapour-deposited onto a side of the second housing element facing the housing interior. In this way, a wear-free as well as contactless interaction of the counter-electrode with the sensor element can be achieved in order to enable the inductive detection of the movement of the second housing element. The counter electrode can thus improve an accuracy in the detection of the movement of the second housing element. Hereby, quasi the required actuation travel can be extremely minimized (or reduced), so that more or less the volume of the housing interior remains constant during actuation. Alternatively to the counter electrode, it is further conceivable that the actuation device can be arranged with respect to the vehicle part in such a way that the vehicle part itself can interact with the sensor element as a counter electrode. Thus, it is conceivable that the vehicle part comprises a metal sheet through which an electric field of the sensor element can be influenced. In this case, an additional counter-electrode is not necessary.

In an actuation device according to the invention, it is furthermore conceivable that the housing unit has a fastening area which runs at least in sections around the housing interior and/or the movement clearance and in which the second housing element is fastened to the first housing element in a form-fitting and/or material-locking manner, in particular wherein the first housing element is fastened in the fastening area to the second housing element by a weld, in particular in the form of a weld seam or at least one weld spot. By means of the fastening area, the first and second housing elements can be fastened to one another, preferably rotationally symmetrically. During the movement of the second housing element between the rest position and the actuation position, it may be provided that the fastening area moves along with the second housing element, in particular rigidly relative to the second housing element. Likewise, it is conceivable that the fastening area remains rigid with respect to the first housing element and/or the vehicle part when the second housing element moves between the rest position and the actuation position. Furthermore, it is conceivable that the second housing element is guided in the fastening area on the first housing element and/or the relative movement of the second housing element to the first housing element is enabled in the fastening area. By means of the circumferential fastening area, a sealing effect may be achievable at the same time. Thus, the fastening area may be configured in such a way that a penetration of liquid into the interior of the housing can be prevented at least in sections or completely in the fastening area. Furthermore, an intuitive operation of the actuation device may be favoured by a circumferential fastening area if the user can actuate the actuation device centrally. Welding the first and second housing elements further has the advantage that a manufacturing of the housing unit can be automated. Further, the weld may be a continuous weld which is formed completely circumferentially around the interior of the housing. This can enable an advantageous sealing effect in the fastening area in order to prevent liquid from penetrating into the interior of the housing.

Furthermore, in an actuation device according to the invention, it is conceivable that the movement clearance for moving the second housing element from the rest position to the actuation position comprises a gap between the first and the second housing element, which gap defines a maximum movement path of the second housing element relative to the first housing element. The size of the gap may define the maximum movement path. In particular, the first and/or second housing element may comprise a protrusion (as a stop) extending towards the opposite housing element. As a result, the gap may be formed, in particular on a side of the projection facing the second housing element. At the same time, a stop for the movement can be formed in a simple manner by the gap and/or the projection in order to define the maximum movement path of the second housing element, by defining the movement path it can further be ensured that a user does not damage the actuation device, in particular components in the housing interior, even if a higher actuation force is applied than intended. Furthermore, inductive detection of the movement of the second housing element can thereby be simplified if the movement path is predetermined.

It is further conceivable in an actuation device according to the invention that the restoring device is arranged at the gap, i.e. in particular immediately adjacent to the gap or in the gap, so that the gap is sealed by the restoring device. In particular, the restoring device may be arranged in the vicinity of the gap so as to seal the gap. In this regard, the gap may also limit deformation of the restoring device so that the restoring device is not damaged even when a user applies an increased actuation force. The gap can be formed circumferentially around the housing interior. The gap creates a defined space for movement which can be reliably sealed by the restoring device.

Preferably, in an actuation device according to the invention, it can be provided that the first housing element has a guide section in which a counter-guide section of the second housing element can be guided during the movement of the second housing element from the rest position into the actuation position, in particular wherein the guide section on the first housing element and/or the counter-guide section on the second housing element is designed to run around, in particular around the housing interior and/or the movement clearance, at least in sections. Preferably, the guide section and the counter-guide section have a mechanical clearance relative to one another in order to prevent or reduce friction against one another. In particular, the guide section may be formed as an opening, and the counter-guide section may be formed as an engagement element which engages in the opening and can thereby be guided within the opening. Preferably, the guide section may comprise a plurality of openings in which a plurality of engagement elements of the second housing element are guidably supported. It is further conversely conceivable that the second housing element comprises one or more openings in which one or more engagement elements are guidably mounted. By means of the guide section, the path of movement of the second housing element relative to the first housing element may be steerable. In particular, linear guidance may be provided thereby. Preferably, the guide section is formed at least partially or completely circumferentially around the housing interior and/or rotationally symmetrically around a central axis of the actuation device.

Preferably, in an actuation device according to the invention, it may be provided that the first and second housing elements each comprise at least one or more form-fitting means/device for producing a form-fit between the first and second housing elements in the rest position of the second housing element, in particular wherein the restoring device biases the second housing element in the rest position towards the first housing element against a direction of movement from the rest position into the actuation position. The form-fitting device may preferably be clip elements, by means of which a snap-in connection between the first and second housing elements is enabled at least in the rest position. By biasing the restoring device when the second housing element is in the rest position, it can be caused that the restoring device maintains its sealing effect and thus remains pressed against the first and/or second housing element when the second housing element is in the rest position. At the same time, manufacturing tolerances can thereby be compensated. Also, a rattling of the device can thereby be reduced or avoided. Preferably, an actuation force of the actuation device may be defined by the bias of the restoring device in the rest position of the second housing element. This can thus be predetermined in a simple manner. The material-locking device further offer the advantage that, in a simple manner, a movement of the second housing element against the direction of movement from the rest position into the actuation position is prevented in the rest position, while at the same time a movement of the second housing element from the rest position into the actuation position is enabled. Further, an assembly may be simplified.

It is further conceivable in an actuation device according to the invention that the first housing member comprises a connector section for providing a switching signal of the switching device for the vehicle function, the connector section extending from the first housing member at a side opposite to the second housing member. By means of the connector section, a connection possibility can be created in a simple manner in order to connect the switching device to a vehicle electronic system when the housing unit is mounted on the outside of the vehicle part. The connector section thus has, in particular, an interface function which makes it possible to connect the actuation device to different vehicle systems, for example in order to trigger different vehicle functions. Furthermore, the connector section can simplify sealing of the interior of the housing if the connector section is formed integrally with the first housing element. For example, electrical lines, preferably in the form of electrical conductors, may be integrated into the first housing element to enable electrical connection of the switching device to a vehicle electronic system. By integrating the electrical conductors into the connector section, sealing of the electrical conductors may be simultaneously enabled or at least simplified with respect to the environment of the connector section.

Furthermore, in an actuation device according to the invention, it may advantageously be provided that the first housing element comprises at least one fastening opening for passing through a fastening means/device for fastening the actuation device to the vehicle part. By means of the fastening opening for passing a fastening device therethrough, a simple fastening interface may be enabled to enable the actuation device to be mounted on different vehicle parts. For example, it is conceivable that the actuation device can be screwed to the vehicle part through the fastening apertures, in particular if the vehicle part comprises fastening apertures corresponding to the fastening apertures. In this case, a releasable fastening of the actuation device may further be achieved. Furthermore, the fastening to the vehicle part may take place above the interior of the housing, so that the fastening device are not visible to a user from the outside. Thus, integration of the actuation device into an appearance of the vehicle may be simplified.

Furthermore, it is conceivable in an actuation device according to the invention that a sealing device is provided by which the connector section and/or the fastening opening can be sealed against penetration of liquid into the housing interior, in particular wherein the sealing device is arranged on a surface of the first housing element, so that the sealing device can be pressed against the vehicle part when the actuation device is mounted on the vehicle part. The sealing device may in particular comprise a plastic, preferably in the form of an elastomer. Thus, the sealing device can also seal interfaces of the actuation device with the vehicle part and/or with a vehicle electronic system. Preferably, the sealing device can be arranged over the entire surface of the surface of the first housing element. In this way, it can be ensured in a simple manner that the sealing effect is reliably achieved. Furthermore, pressing the sealing device against the vehicle part can compensate for manufacturing tolerances, so that rattling of the actuation devices is reduced or eliminated. Preferably, the sealing device and/or the restoring device may comprise a polyurethane foam and/or a silicone to improve protection against penetration of liquid into the interior of the housing.

It is further conceivable in an actuation device according to the invention that the sealing device and the first housing element form a multi-component injection-molded plastic part. This may simplify manufacturing of the actuation device. Thus, it is conceivable that the sealing device is injection-molded onto the surface of the first housing element in order to enable a full-surface distribution of the sealing device on the first housing element. Furthermore, this allows the first housing element with the sealing device to be handled in a simple manner during assembly if the sealing device and the first housing element form a one-piece assembly unit. Preferably, the sealing device and the first housing element form a two-component injection-molded plastic part.

Furthermore, in an actuation device according to the invention, it may advantageously be provided that the restoring device is formed integrally with the first housing element or is arranged separately, i.e. in particular as a separate component, between the first and the second housing element. If the restoring device is formed integrally with the first housing element, it may be provided, for example, that the restoring device comprises a reduced cross-section of the housing element, so that the first housing element is elastically deformable in the region of the restoring device. For example, the restoring device can be formed between a central region and an edge region of the first housing element. In particular, the first housing element may thereby be formed with a uniform material or the restoring device may comprise a soft component in order to promote elastic deformation. As a result, the movement of the second housing element may be enabled at least in regions relative to the first housing element. Preferably, the restoring device may thereby extend, in particular perpendicularly and/or radially outwardly from the housing interior. In this way, the restoring device can provide a sealing effect in a simple manner and can assume part of the protective function of the housing unit for the switching device. If the restoring device is arranged separately between the first and second housing elements, an assembly of the housing unit may be simplified. For example, it is conceivable that the restoring device can be inserted as an insertion part between the first and second housing elements, in particular if the first and second housing elements are or will be materially-locked to one another.

Furthermore, in an actuation device according to the invention, it is conceivable that a vehicle emblem is arranged on an outer side of the second housing element facing away from the first housing element, which vehicle emblem is attached to the second housing element and/or is integrated into the second housing element. By a vehicle emblem may be understood in particular a manufacturer's mark and/or a model marking. By means of the vehicle emblem, the actuation device can be embedded in a design of a vehicle in an advantageous manner for a user without the actuation device being perceived by a user in a disturbing manner. At the same time, the vehicle emblem can perform an indication function so that the user can quickly identify the location at which the actuation for triggering the vehicle function is to be performed. The vehicle emblem can be arranged as an additional component on the second housing element or be provided integrally with the second housing element. Thus, it is conceivable that the vehicle emblem is directly injection-molded onto the second housing element, so that the vehicle emblem and the second housing element form a multi-component injection-molded plastic part.

According to a further aspect of the invention, a vehicle is provided. The vehicle comprises a, preferably movable, vehicle part, in particular in the form of a door or a flap. It is further provided that an actuation device according to the invention for triggering a vehicle function of the vehicle is arranged on the vehicle part.

Thus, a vehicle according to the invention brings the same advantages as have already been described in detail with reference to an actuation device according to the invention. In particular, the vehicle may be a motor vehicle. By means of the actuation device according to the invention, in particular a small installation space is occupied on the vehicle part. At the same time, the actuation device can be embedded in an external appearance of the vehicle in an advantageous manner. Thus, due to the compact design of the device, further components can be mounted in or on the vehicle part. Furthermore, the design freedom with respect to the appearance and/or with respect to functions of the vehicle part may be improved.

According to a further aspect of the invention, there is provided a method for actuation for triggering a vehicle function of a vehicle by an actuation device, in particular an actuation device according to the invention. The method for actuation thereby comprises the following steps:

- Activating a switching element arranged at least partially in a housing interior defined at least partially by a first and a second housing element of the actuation device, the activating being effected by a movement of the second housing element relative to the first housing element from a rest position to an actuation position,
- Elastic return of the second housing element into the rest position by a restoring device which closes a movement free space between the first and second housing element at least in regions and thereby simultaneously seals the housing interior at least in regions against penetration of liquid.

Thus, a method for actuation according to the invention brings the same advantages as have already been described in detail with reference to an actuation device according to the invention and/or a vehicle according to the invention. The vehicle may in particular be a vehicle according to the invention. The moving of the second housing element may in particular be triggered by a manual pressure on the second housing element by a user. It may be provided that the switching device inductively detects the movement of the second housing element relative to the first housing element. In particular, the switching device emits a switching signal in response to the actuation of the switching device. By elastically returning the second housing element to the rest position, it may be possible for a repeated actuation of the actuation device to be carried out, in particular immediately, after a first actuation. Due to the simultaneous sealing, an additional sealing device may be omitted or may be more simply formed. Thus, a method for actuation according to the invention enables a simple and intuitive actuation by a user using a compact actuation device.

BRIEF DESCRIPTION OF THE FIGURES

Further advantages, features and details of the invention will be apparent from the following description, in which embodiments of the invention are described in detail with reference to the drawings. In this connection, the features mentioned in the claims and in the description may each be essential to the invention individually or in any combination. It schematically shows:

DETAILED DESCRIPTION OF THE INVENTION

In the following description of some embodiments of the invention, the identical reference signs are used for the same technical features even in different embodiments.

Figure 1:
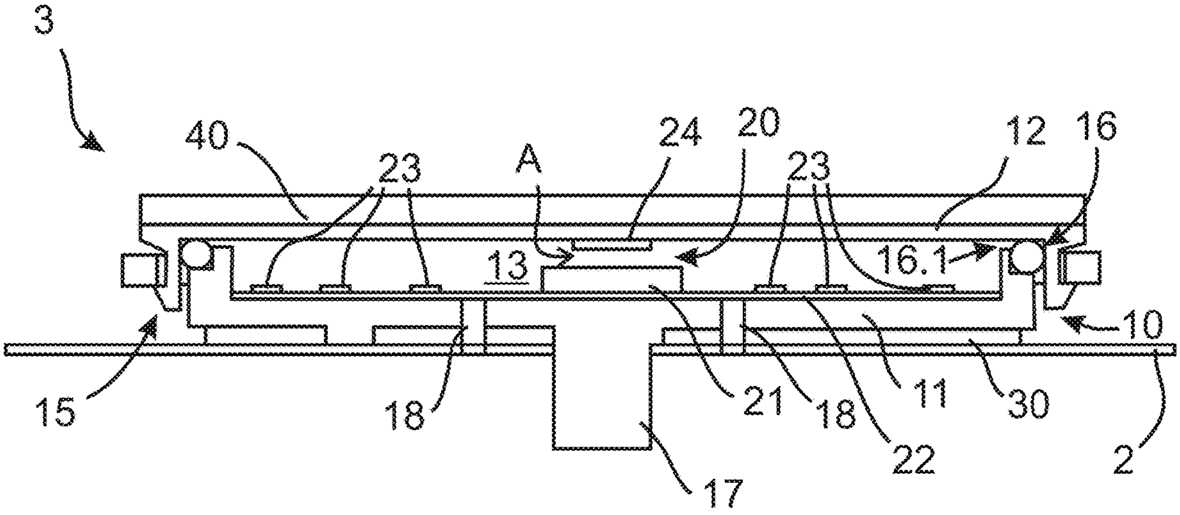
- FIG. 1 an actuation device according to the invention in a cross-sectional view,
- FIG. 2 the actuation device in at least partially sectioned perspective view,
- FIGS. 3-4 the actuation device in schematic detail view with a second housing element in a rest position and an actuation position,
- FIGS. 5-6 an actuation device according to the invention in schematic detail view in a further embodiment example with a second housing element in a rest position and an actuation position,
- FIG. 7 an actuation device according to the invention in schematic detail view in a further embodiment, FIG. 8 a schematic detailed view of an actuation device according to the invention in a further embodiment, FIG. 9 a vehicle according to the invention with an actuation device according to the invention, FIG. 10 a schematic view of process steps of a method for actuation according to the invention

FIG. 1 shows an actuation device 3 according to the invention, which is designed for mounting on a, preferably movable, vehicle part 2, in particular in the form of a door or flap. The actuation device 3 has a housing unit 10, wherein a housing interior 13 is formed by a first and a second housing element 11, 12. A switching device 20 is arranged in the housing interior 13, which comprises a switching element 21 in the form of a sensor element 21 which is arranged on a printed circuit board 22 with electronic components 23. The sensor element 21 is preferably designed for inductively detecting a movement of the second housing element 12. For this purpose, a counter electrode 24 is arranged on the second housing element 12, in particular in the housing interior 13, at a distance A from the sensor element 21. An electromagnetic field can be generated by the sensor element 21, which interacts with the counter-electrode 24, so that a wear-free change in the electromagnetic field can be detected when the counter-electrode 24 moves towards the sensor element 21. The actuation takes place by the movement of the counter electrode 24 towards the sensor element 21 without contact, so that no wear can occur. Preferably, the counter electrode 24 has a planar extension on the second housing element 12. For this purpose, the counter-electrode 24 may, for example, be bonded as a foil or vapor-deposited onto the second housing element 12. The printed circuit board 22 and/or the first housing element 11 of the housing unit 10 has fastening openings 18, through which a fastening device for fastening the actuation device 3 to the vehicle part 2 can be inserted. This allows the mounting to be carried out via the housing interior 13, so that the fastening device are not visible to a user from the outside and consequently cannot disturb the external appearance. For connecting the sensor element 21 and/or the printed circuit board 22 to a vehicle electronic system, the actuation device 3 comprises a connector section 17 extending from the housing interior 13 on a side of the first housing element 11 opposite the second housing element 12. Preferably, the connector section 17 comprises electrical leads to enable electrical contacting. Additionally or alternatively, it is conceivable that the printed circuit board 22 comprises a module for wireless data transmission. In this case, the connector section 17 may be omitted, for example. The connector section 17 as well as the fastening openings 18, are in particular each circumferentially sealed by a sealing device 30, wherein the sealing device 30 in particular fulfils a sealing function when the sealing device 30 is pressed against the vehicle part 2 via the fastening device inserted through the fastening openings 18. Preferably, the sealing device 30 may be injection-molded onto the first housing element 11 in a multi-component plastic injection molding process. This results in particular in an assembly-friendly structural unit of the first housing element 11 and the sealing device 30. Furthermore, a vehicle emblem 40 is arranged on an outer side 12.3 of the second housing element 12, which can be formed integrally with the second housing element 12. The vehicle emblem 40 may, on the one hand, highlight an actuation surface to a user and, on the other hand, allow the actuation device 3 to blend into a vehicle design.

Figure 2:
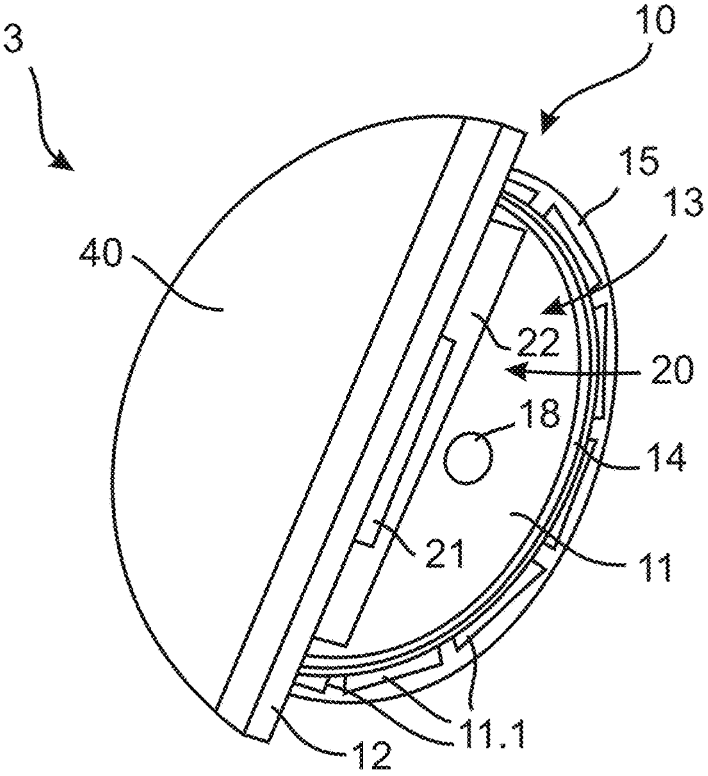

Furthermore, a restoring device 14 is arranged between the first housing element 11 and the second housing element 12 to bring the second housing element 12 into a rest position I when the second housing element 12 is in an actuation position II for actuating the switching device 20. As can be seen in FIG. 2, the restoring device 14 is thereby formed circumferentially around the housing interior 13 to prevent liquid from entering the housing interior 13. Depending on the structural design of the first and/or second housing element 11, 12, a sectional circumferential design of the restoring device 14 can also be provided in order to prevent the penetration of liquid at these sections.

Figure 3:
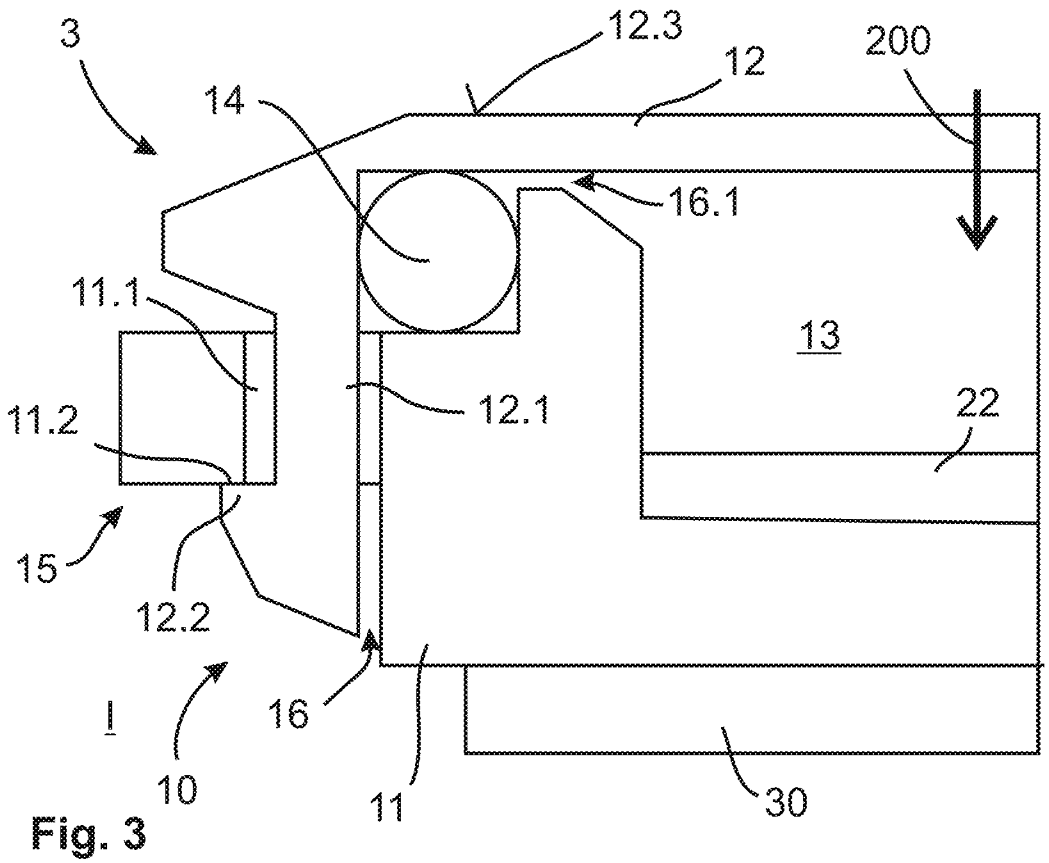
Figure 4:
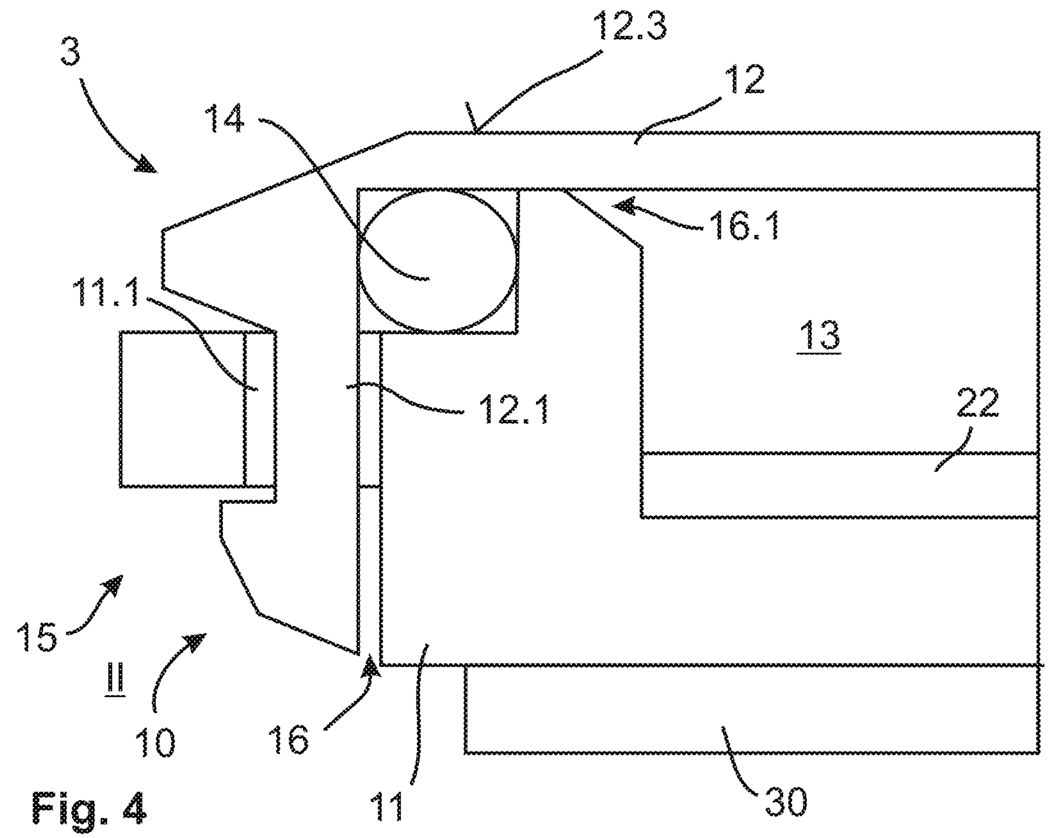

The rest position I of the second housing element 12 is shown in FIG. 3. FIG. 4 shows the actuation position II of the second housing element 12. In order to enable the movement of the second housing element 12 relative to the first housing element 11 and thereby bring the counter electrode 24 closer to the sensor element 21, a movement free space 16 is formed between the first and second housing elements 11, 12. The movement free space 16 comprises an area between the housing elements 11, 12 into which the second housing element 12 can be moved and/or in which the second housing element 12 is at least partially detached from the first housing element 11 to allow relative movement. For this purpose, the first and second housing elements 11, 12 are embodied separately from one another, the second housing element 12 being guided with a counter-guide section 12.1 in a guide section 11.1 of the first housing element 11, in particular circumferentially around the movement free space 16. For this purpose, the first and second housing elements 11, 12 each have, in a fastening area 15 of the housing unit 10, one or more form-fitting device 11.2, 12.2 which, in the rest position I, bring about a form-fitting of the first and second housing elements 11, 12. In particular, the counter guide section 12.1 thereby comprises a latching means/device which latches with a mating latching device of the guide section 11.1 of the first housing element 11. In the actuation position II, the latching connection is cancelled. As can be further seen in FIGS. 3 and 4, the restoring device 14 is compressed when the second housing element 12 is moved along a direction of movement 200. The movement of the second housing element 12 thereby has a maximum movement path defined by a gap 16.1 of the movement clearance 16 between the first and second housing elements 11, 12. In the actuation position II, the second housing element 12 rests on the first housing element 11, in particular so that the actuation device 3, in particular the restoring device 14, is not damaged even in the event of a greater actuation force along the direction of movement 200. The restoring device 14 is thereby arranged such that the gap 16.1 is circumferentially sealed by the restoring device 14. Preferably, the restoring device 14 thereby biases the second housing element 12 against the direction of movement 200 in the rest position I. In this way, a sealing effect of the restoring device 14 at the gap 16.1 can also be ensured in the rest position I. In order to effect the movement from the actuation position II into the rest position I, the restoring device 14 preferably comprises an elastic material which is deformed during the movement of the second housing element 12 along the direction of movement 200 into the actuation position II, so that an elastic restoring force acts on the second housing element 12 counter to the direction of movement 200 by the restoring device 14 in the actuation position II. Thus, a compact design of the actuation device 3 can be achieved in a simple manner if the restoring device 14 combines several functions.

Figure 5:
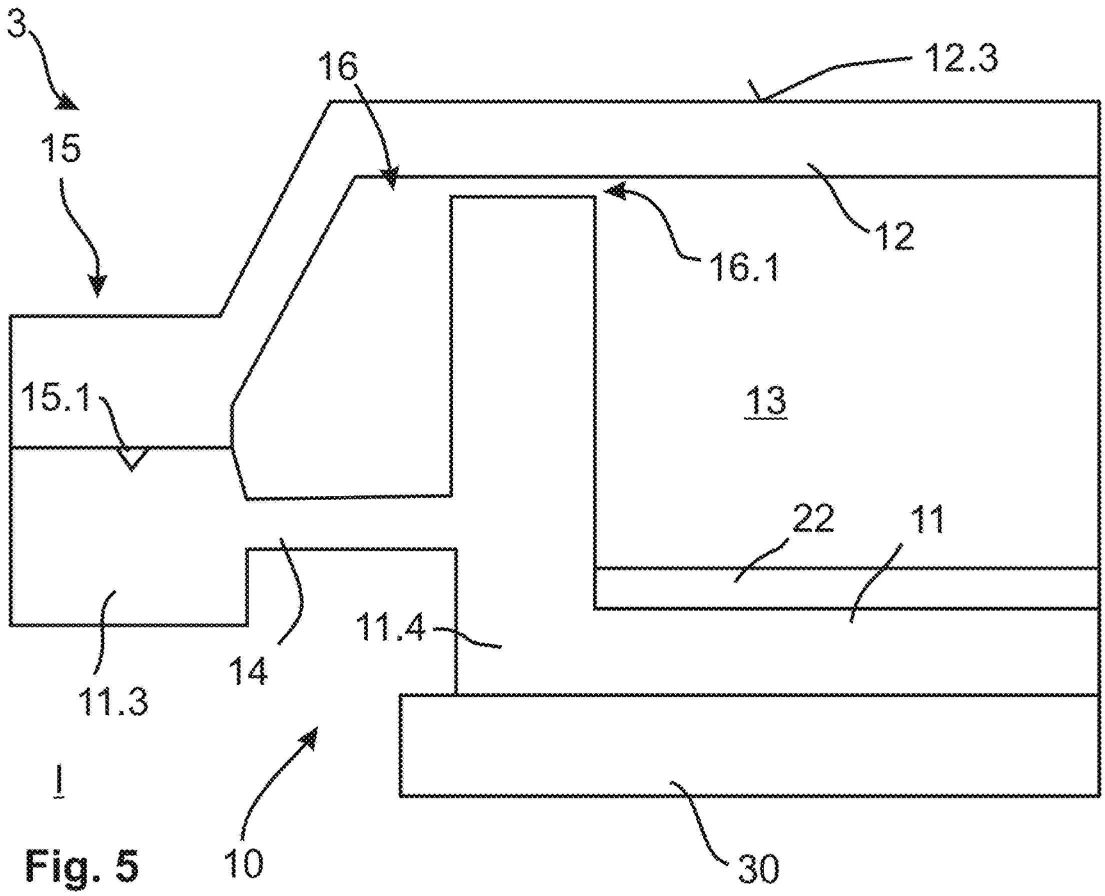
Figure 6:
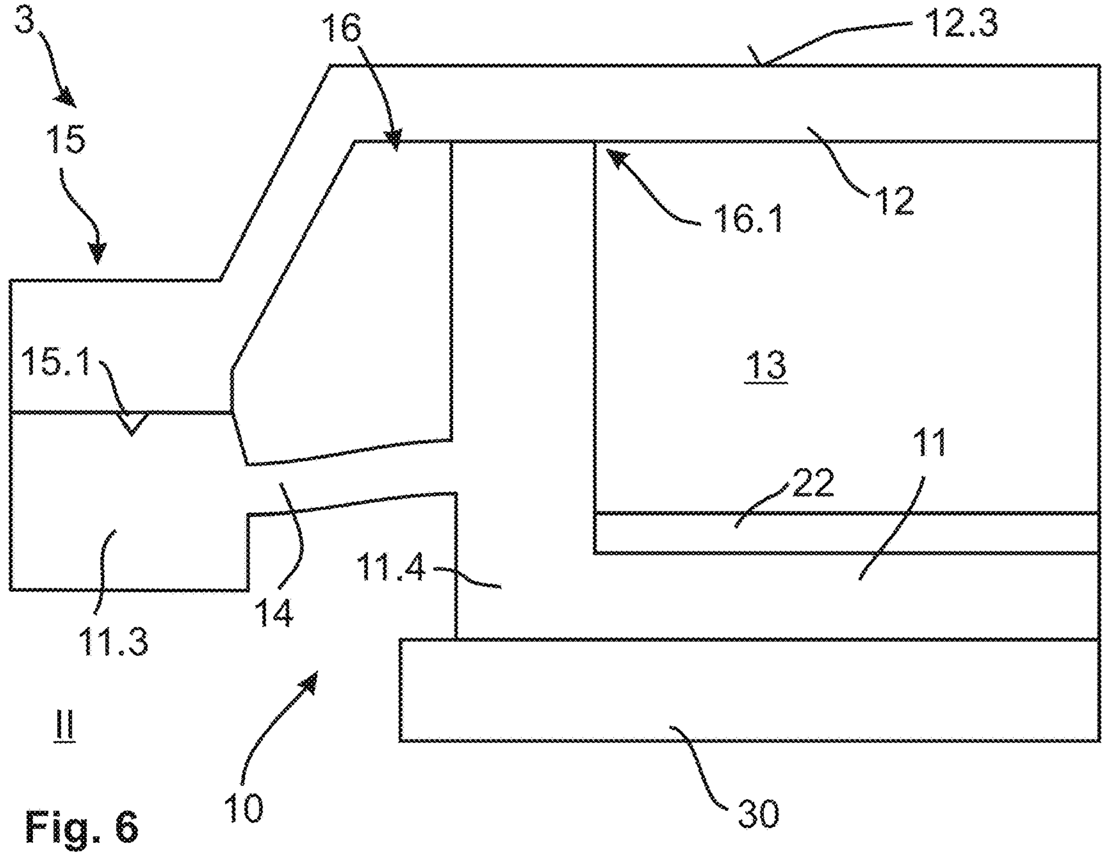

FIGS. 5 and 6 show a schematic detailed view of an actuation device 3 according to the invention in a further embodiment. In this case, the actuation device 3 corresponds essentially to the first embodiment example, although a fastening area 15 and the restoring device 14 have a further possible embodiment. In this case, the fastening area 15 comprises a circumferential weld 15.1, in particular in the form of a weld seam, to which a first and a second housing element 11, 12 of a housing unit 10 of the actuation device 3 are connected. The restoring device 14 is formed in the form of a reduced cross-section of the first housing element 11 between an edge region 11.3 and a central region 11.4 of the first housing element 11. As a result, the restoring device 14 closes off a movement free space 16, in particular on the vehicle side. In particular, the first housing element 11 comprises an elastic material at least at the restoring device 14. If the second housing element 12 is actuated by a user from an outer side 12.3 of the second housing element 12, the housing elements 11, 12 remain rigidly arranged relative to one another in the fastening area 15. However, in the process the second housing element 12 lowers at a gap 16.1 so that an elastic bending results at the restoring device 14, by means of which the restoring device 14 biases the second housing element 12 in the actuation position II back into the rest position I. In this case, the restoring device 14 forms part of the housing unit 10 and is formed circumferentially around a housing interior 13, so that penetration of liquids into the housing interior 13 is prevented at least in sections by the restoring device 14. In particular, the restoring device 14 assumes part of the housing function of the housing unit 10.

Figure 7:
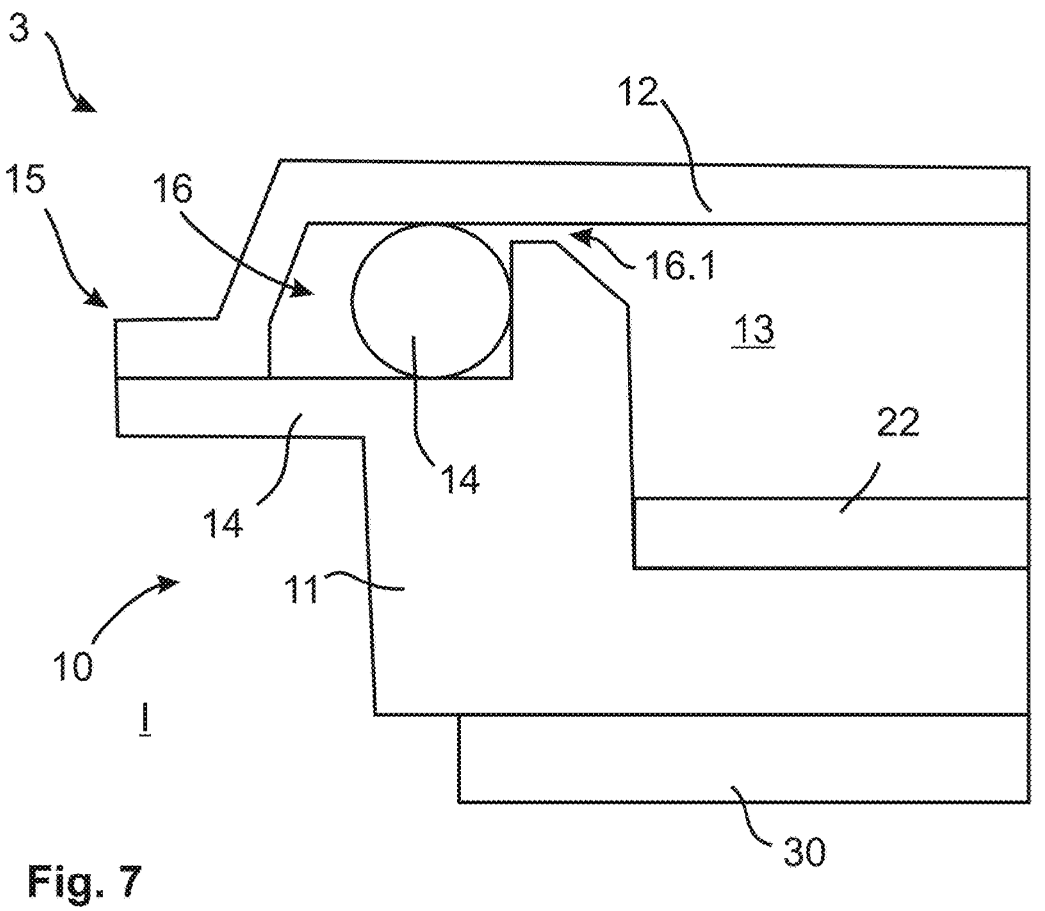

FIG. 7 shows a further example of an actuation device according to the invention in schematic detail. Here, a restoring device 14 is arranged between the housing elements 11, 12 and a further restoring device 14 is provided, which is formed as a reduced cross-section of a first housing element 11. The first and second housing elements 11, 12 are connected to each other at a fastening area 15. If the second housing element 12 is now actuated and pressed in the direction of the first housing element 11, on the one hand the restoring device 14 between the housing elements 11, 12 is compressed and on the other hand the further restoring device 14 of the first housing element 11 is elastically bent. Both restoring device 14 may complement each other in an actuation position II of the second housing element 12 to jointly apply a restoring force. The restoring device 14 between the housing elements 11, 12 thereby seals a movement free space 16 for moving the second housing element 12, so that a screw connection or a sectional connection, for example, can be provided in the fastening area 15. Preferably, the restoring device 14 between the housing elements 11, 12 is thereby formed completely circumferentially around the housing interior 13. The further restoring device 14 of the first housing element 11 further prevents liquid from penetrating from the lower edge region.

Figure 8:
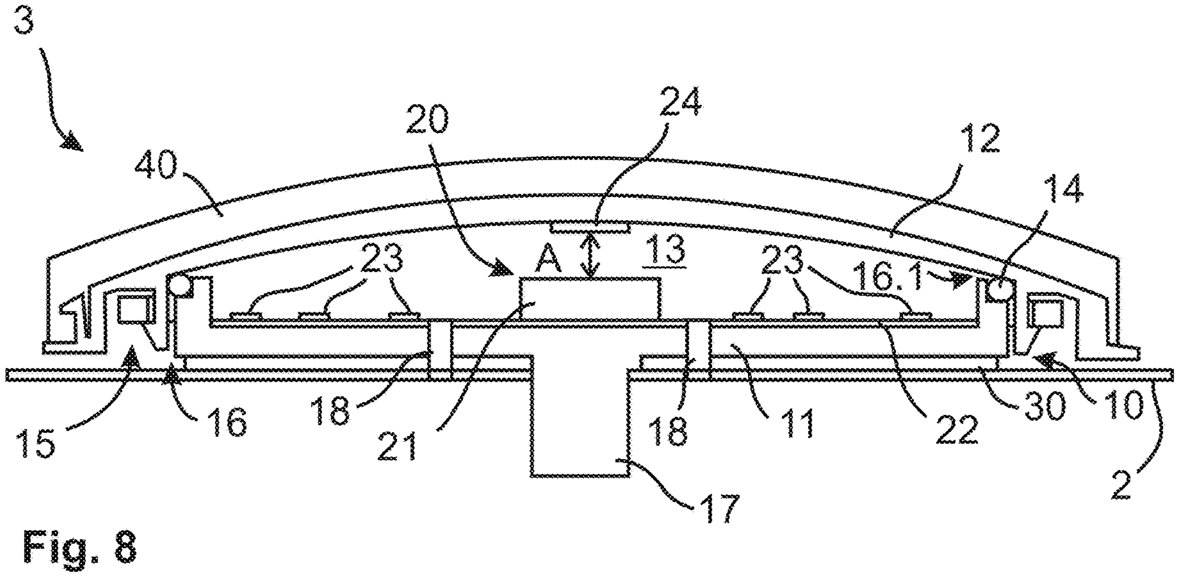

FIG. 8 shows an actuation device 3 according to the invention, which is designed essentially in accordance with the first embodiment. In this case, the vehicle emblem 40 is materially-locking connected to a housing unit 10 of the actuation device 3 via a latching connection. The housing unit 10 has two housing elements 11, 12 which are of plate-like design. In this way, a low overall height of the actuation device 3 can be achieved. Thereby, the vehicle emblem 40 and the second housing element 12, to which the vehicle emblem 40 is fastened, in particular in a form-fitting manner, are formed in a curved manner, whereby a housing inner space 13 between the housing elements 11, 12 is enlarged. Furthermore, the distance A between the counter electrode 24 and the sensor element 21 is clearly visible.

Figure 9:
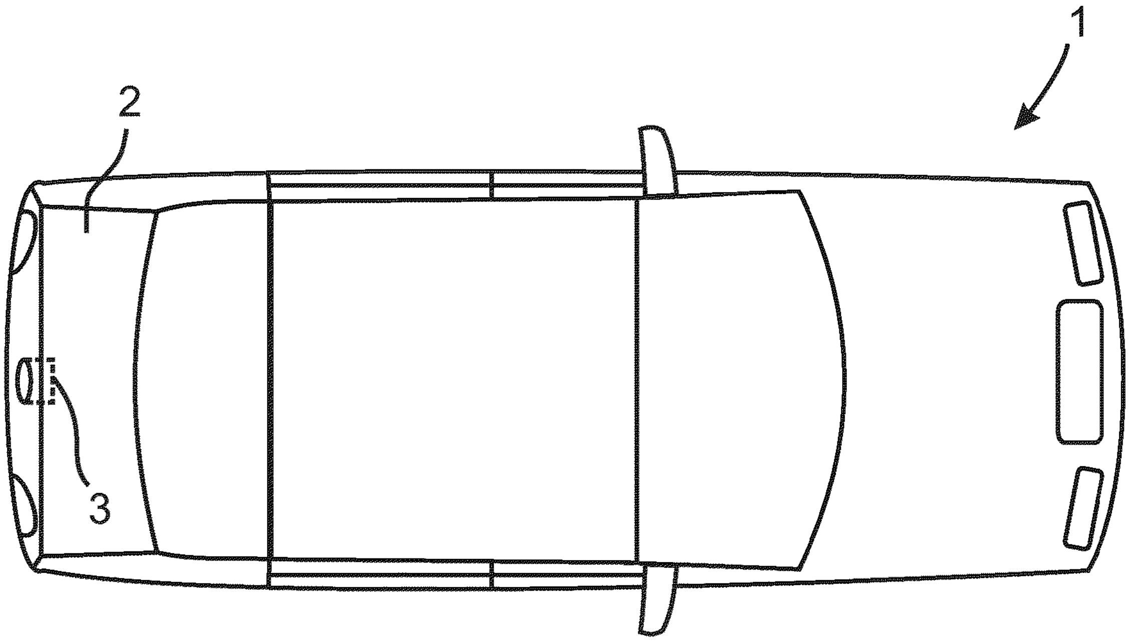

FIG. 9 shows a vehicle 1 according to the invention with a movable vehicle part 2, on which an actuation device 3 according to the invention is arranged. In particular, the actuation device 3 may be configured according to one of the preceding embodiments.

Figure 10:
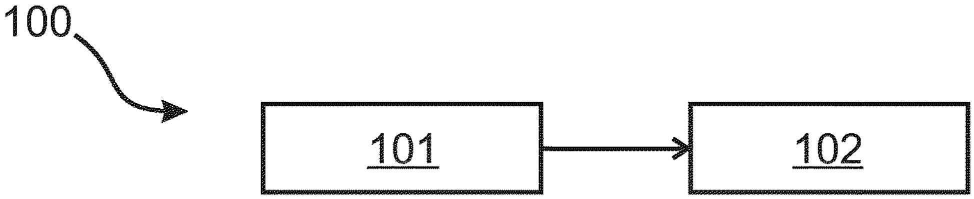

FIG. 10 further shows a method for actuation 100 in schematic representation of method steps. Here, an activation 101 of a switching element 21, which is arranged in a housing interior 13 between a first and a second housing element 11, 12, is effected by a movement of the second housing element 12 relative to the first housing element 11 from a rest position I to an actuation position II. Subsequently, an elastic return 102 of the second housing element 12 to the rest position I is effected by a restoring device 14, which at the same time seals the housing interior 13 against an ingress of liquid at least in certain areas. The process sequence of the method for actuation 100 is further illustrated in FIGS. 3 and 4 or 5 and 6, and vice versa in each case.

The foregoing explanation of the embodiments describes the present invention solely in the context of examples. Of course, individual features of the embodiments can be freely combined with each other, provided that this is technically sensible, without leaving the scope of the present invention.

List of Reference Signs

1 Vehicle
2 Vehicle part
3 Actuation device
10 Housing unit
11 First housing element
11.1 Guide section
11.2 Form-fitting device
11.3 edge region
11.4 central region
12 Second housing element
12.1 Counter guide section
12.2 Form-fitting device
12.3 Outside from 12
13 Housing interior
14 Restoring device
15 Fastening area
15.1 circumferential weld
16 movement free space
16.1 Gap
17 Connector section
18 Fastening opening
20 Switching device
21 Switching element, in particular sensor element
22 Printed circuit board
23 Electronic component
24 Counter electrode
30 Sealing device
40 Vehicle emblem
100 Method for actuation
101 Movement of 12
102 Elastic reset of 12
200 Direction of movement
I Rest position
II Actuation position
A Distance/gap between 21 and 24

The invention claimed is:

1. An actuating device for mounting on a vehicle part comprising:

an electrical switching device with a switching element for triggering a vehicle function, and a housing unit having at least a first and a second housing element which at least partially form a housing interior in which the switching element is arranged, wherein a movement free space is formed between the first and second housing elements, whereby the second housing element is movable at least in regions between a rest position and an actuation position for actuating the switching element relative to the first housing element, wherein the movement free space for moving the second housing element from the rest position to the actuation position comprises a gap between the first and the second housing element, which gap defines a maximum movement path of the second housing element relative to the first housing element, wherein the gap is sealed by a restoring device for moving the second housing element from the actuation position into the rest position, wherein the movement free space is closed, at least in regions, by the restoring device, in order to prevent liquid from penetrating into the gap and to the switching element, and wherein the housing unit has a fastening area which runs at least in sections at least around the housing interior or the movement free space and in which the second housing element is fastened to the first housing element at least in a form-fitting or material-locking manner, wherein the fastening area moves along with the second housing element relative to the first housing element.

2. The actuating device according to claim 1, wherein the restoring device comprises an elastic material at least for deforming or bending the restoring device during the movement of the second housing element from the actuation position to the rest position.

3. The actuating device according to claim 1, wherein the restoring device is configured to run around the housing interior, at least in sections, in order to prevent liquid from penetrating into the housing interior, at least in sections.

4. The actuating device according to claim 1, wherein the switching element is a sensor element for inductively detecting the movement of the second housing element.

5. The actuating device according to claim 4, wherein at least the switching device has a counter electrode for electromagnetic interaction with the sensor element or the counter electrode being arranged over a distance from the sensor element and interacting therewith in a contact-free manner.

6. The actuating device according to claim 1, wherein the second housing element is directly fastened to the first housing element at least in a form-fitting or material-locking manner.

7. The actuating device according to claim 1, wherein the first housing element has a guide section in which a counter guide section of the second housing element can be guided during the movement of the second housing element from the rest position into the actuation position.

8. The actuating device according to claim 1, wherein the first and second housing elements each have at least one form-fitting device for producing a form fit between the first and second housing elements in the rest position of the second housing element.

9. The actuating device according to claim 1, wherein the first housing member has a connector section for providing a switching signal of the switching device for the vehicle function, the connector section extending from the first housing element at a side opposite to the second housing element.

10. The actuating device according to claim 9, wherein the first housing element has at least one fastening opening for fastening the actuating device to the vehicle part.

11. The actuating device according to claim 10, wherein a sealing device is provided, by means of which at least the connector section or the fastening opening can be sealed against the penetration of liquid into the housing interior.

12. The actuating device according to claim 11, wherein the sealing device and the first housing element form a multi-component plastic injection-moulded part.

13. The actuating device according to claim 1, wherein the restoring device is formed integrally with the first housing element or is arranged separately between the first and the second housing element.

14. The actuating device according to claim 1, wherein a vehicle emblem is arranged on an outer side of the second housing element facing away from the first housing element, which vehicle emblem is at least fastened to the second housing element or is integrated into the second housing element.

15. The actuating device of claim 1, wherein the restoring device has a diameter that is larger than an outer diameter of the gap.

16. A vehicle comprising a vehicle part, wherein an actuating device for triggering a vehicle function of the vehicle is arranged on the vehicle part, wherein the actuating device comprises:

an electrical switching device with a switching element for triggering a vehicle function, and a housing unit having at least a first and a second housing element which at least partially form a housing interior in which the switching element is arranged, wherein a movement free space is formed between the first and second housing elements, whereby the second housing element is movable at least in regions between a rest position and an actuation position for actuating the switching element relative to the first housing element, wherein the movement free space for moving the second housing element from the rest position to the actuation position comprises a gap between the first and the second housing element, which gap defines a maximum movement path of the second housing element relative to the first housing element, wherein the gap is sealed by a restoring device for moving the second housing element from the actuation position into the rest position, wherein the movement free space is closed, at least in regions, by the restoring device, in order to prevent liquid from penetrating into the gap and to the switching element, and wherein the housing unit has a fastening area which runs at least in sections at least around the housing interior or the movement free space and in which the second housing element is fastened to the first housing element at least in a form-fitting or material-locking manner, wherein the fastening area moves along with the second housing element relative to the first housing element.

17. A method for actuation for triggering a vehicle function of a vehicle by an actuating device comprising:

an electrical switching device with a switching element for triggering a vehicle function, and a housing unit having at least a first and a second housing element which at least partially form a housing interior in which the switching element is arranged, wherein a movement free space is formed between the first and second housing elements, whereby the second housing element is movable at least in regions between a rest position and an actuation position for actuating the switching element relative to the first housing element, wherein the movement free space for moving the second housing element from the rest position to the actuation position comprises a gap between the first and the second housing element, which gap defines a maximum movement path of the second housing element relative to the first housing element, wherein the gap is sealed by a restoring device for moving the second housing element from the actuation position into the rest position, wherein the movement free space is closed, at least in regions, by the restoring device, in order to prevent liquid from penetrating into the gap and to the switching element, and wherein the housing unit has a fastening area which runs at least in sections at least around the housing interior or the movement free space and in which the second housing element is fastened to the first housing element at least in a form-fitting or material-locking manner, wherein the fastening area moves along with the second housing element relative to the first housing element, and wherein the method comprises the following steps:

activation of the switching element which is arranged in the housing interior which is at least partially formed by the first and the second housing element of the actuating device, the activation being effected by a movement of the second housing element relative to the first housing element from the rest position into an actuation position, and resilient return of the second housing element into the rest position by the restoring device which closes off the movement-free space between the first and second housing elements at least in regions and thereby simultaneously seals off the housing interior at least in regions against the penetration of liquid.

* * * * *